(12) United States Patent
Buzzard

(10) Patent No.: US 8,256,598 B2
(45) Date of Patent: Sep. 4, 2012

(54) PERMANENT MAGNET WRAP SPRING CLUTCH

(75) Inventor: Brian W. Buzzard, East Amherst, NY (US)

(73) Assignee: American Precision Industries, Inc., Amherst, NY (US)

( * ) Notice: Subject to any disclaimer, the term of this patent is extended or adjusted under 35 U.S.C. 154(b) by 595 days.

(21) Appl. No.: 12/434,815

(22) Filed: May 4, 2009

(65) Prior Publication Data

US 2009/0272615 A1    Nov. 5, 2009

Related U.S. Application Data

(60) Provisional application No. 61/050,321, filed on May 5, 2008.

(51) Int. Cl.
*F16D 27/01* (2006.01)
*F16D 27/105* (2006.01)
(52) U.S. Cl. .................... 192/84.31; 192/84.81
(58) Field of Classification Search ............. 192/84.81, 192/12 BA, 35, 41 S, 84.31, 81 C
See application file for complete search history.

(56) References Cited

U.S. PATENT DOCUMENTS

| | | | | |
|---|---|---|---|---|
| 2,976,976 A * | 3/1961 | Parker | | 192/43 |
| 3,263,784 A * | 8/1966 | Pierce | | 192/84.31 |
| 4,262,787 A * | 4/1981 | Takefuta et al. | | 192/84.81 |
| 4,466,522 A * | 8/1984 | Shibuya | | 192/84.81 |
| 4,718,526 A * | 1/1988 | Koitabashi | | 192/35 |
| 4,848,545 A | 7/1989 | Nishimura | | |
| 5,031,744 A | 7/1991 | Nishimura | | |
| 6,119,841 A | 9/2000 | Orlamunder | | |
| 6,247,569 B1 | 6/2001 | McGuire et al. | | |
| 6,484,861 B1 | 11/2002 | Wussow | | |
| 6,659,248 B2 | 12/2003 | Terada | | |
| 6,695,112 B1 | 2/2004 | Webber | | |
| 6,823,972 B2 | 11/2004 | Gmirya | | |
| 7,051,854 B2 | 5/2006 | Kossett | | |
| 2002/0003077 A1 * | 1/2002 | Moroi et al. | | 192/84.81 |
| 2006/0289227 A1 | 12/2006 | Chino et al. | | |
| 2007/0289831 A1 * | 12/2007 | Ota et al. | | 192/38 |
| 2008/0041686 A1 * | 2/2008 | Hoshino et al. | | 192/3.56 |
| 2009/0314600 A1 * | 12/2009 | Kato et al. | | 192/84.31 |

OTHER PUBLICATIONS

Getting Up to Speed with Wrap-Spring Clutch/Brakes. No-slip clutch/brakes keep loads and drives synced up. http://machinedesign.com/print/70110.

* cited by examiner

*Primary Examiner* — David D Le
*Assistant Examiner* — Terry Chau
(74) *Attorney, Agent, or Firm* — David G. Maire; Beusse Wolter Sanks Mora & Maire, P.A.

(57) ABSTRACT

A permanent magnet activated wrap spring clutch (10). A coil spring (32) surrounds an input hub (14) and an output hub (22) and is selectively engaged to wrap down upon the hubs for the transmittal of torque. In an unpowered, engaged condition of the clutch, a permanent magnet (40) attracts a control collar (38) attached to the spring into frictional engagement with a rotating input element (20). Rotation of the control collar causes the spring to wrap down from its somewhat oversized diameter at rest to grip the hubs. In a powered, disengaged condition of the clutch, an energized coil (44) causes the magnetic field of the permanent magnet to move away from the control collar, thereby removing the frictional engagement and allowing the spring to unwrap. The clutch provides torque transmittal without electrical power and ensures complete disengagement regardless of a low momentum or high drag on the output.

16 Claims, 2 Drawing Sheets

PERMANENT MAGNET WRAP SPRING CLUTCH

This application claims benefit of the 5 May 2008 filing date of U.S. provisional patent application No. 61/050,321, incorporated by reference herein.

FIELD OF THE INVENTION

This invention related generally to the field of wrap spring clutches.

BACKGROUND OF THE INVENTION

Wrap spring clutches are well known in the art and are used in a variety of forms for transmitting rotating shaft power. As illustrated in FIG. 1, the basic design of a wrap spring clutch 1 involves a coil spring 3 surrounding two shafts (or hubs) to transfer torque from the input or drive shaft 5 to an output or driven shaft 7 through the spring as the spring wraps down on both shafts. Commonly the spring is fixed on one end to one of the shafts. When the clutch is activated, the unfixed end of the spring attaches to the other shaft and is rotated until the spring is wrapped down onto both shafts, thereby allowing torque to be transmitted from one shaft to the other.

A wrap spring clutch may be activated in various ways. U.S. Pat. No. 6,247,569 describes one arrangement commonly referred to as a standard logic wrap spring clutch. In a standard logic wrap spring clutch, the resting or free inside diameter of the spring is somewhat larger than the outside diameter of the shafts, so that in the absence of some form of engaging action, the free end of the spring does not grip its respective shaft and the clutch does not transfer torque between the shafts. Thus, when no power is provided to a standard logic wrap spring clutch, no torque is transferred through the clutch. To engage the standard logic wrap spring clutch of U.S. Pat. No. 6,247,569, an electromagnet is used to connect the free end of the spring with the drive shaft, thereby causing the spring to wrap down on both shafts. A standard logic wrap spring clutch of this design requires electrical power in order to transmit torque, which is a disadvantage in some applications.

Reverse logic wrap spring clutches are also known. The resting or free inside diameter of the coil spring in a reverse acting wrap spring clutch is somewhat smaller than the outside diameter of the shafts, so that in the absence of some form of disengaging action, both shafts are gripped by the spring and torque is transmitted through the clutch. Thus, the reverse logic wrap spring clutch design eliminates the need for electrical power to transmit torque. To disengage a reverse logic wrap spring clutch, power is applied to magnetically pull a control collar which is connected to the input end of the spring against the clutch housing, thereby causing the spring to unwrap as the driven shaft continues to rotate, eventually causing the spring inside diameter to increase sufficiently to disconnect the two shafts from each other. However, operation of this design requires there to be an adequate degree of momentum in the rotating driven shaft in order to unwrap the spring. For low speed applications or when there is a low momentum driven load or a high degree of output drag, there may be insufficient continued motion of the driven shaft to completely unwrap the spring. Such incomplete disengagement of the clutch can cause excessive wear, heat and premature failure of the device.

BRIEF DESCRIPTION OF THE DRAWINGS

The invention is explained in the following description in view of the drawings that show.

DETAILED DESCRIPTION OF THE INVENTION

The present invention provides a wrap spring clutch that requires no electrical power in order to transmit torque, while at the same time ensuring complete disengagement of the output from the input even in applications where there is little momentum or high drag at the output. This combination of features has heretofore been unavailable in wrap spring clutch designs. The present invention presents a novel coil spring engagement arrangement incorporating both a permanent magnet and an electromagnet for selectively urging a moveable control collar into and out of frictional engagement with the clutch input. The frictional force imparted to the control collar provides the energy to wrap down a coil spring that is slightly oversized when at rest compared to the diameter of the input and output elements. The control collar is urged into frictional engagement by the motive force of the permanent magnet, thereby avoiding the need for electrical power to cause engagement of the clutch. When the electromagnet is powered, the lines of force of the permanent magnet are redirected away from the control collar, thereby allowing the control collar to move away from the clutch input. This eliminates the frictional force and allows the spring to unwrap to its resting diameter, thereby uncoupling the input and output hubs and disengaging the clutch. The uncoupling action depends only upon the spring returning to its at-rest diameter and not upon the continued rotation of the clutch output, thereby ensuring full disengagement of the clutch even in applications where there is little momentum or high drag at the output. The spring wrap clutch of the present invention is particularly useful in applications where electrical power consumption must be minimized and where the driven load has relatively low momentum and/or high drag. One such application is in agricultural planters where multiple rows of relatively low mass, low velocity seed delivery devices must be individually controlled with low power consumption and fail safe seed delivery.

Figure 1:
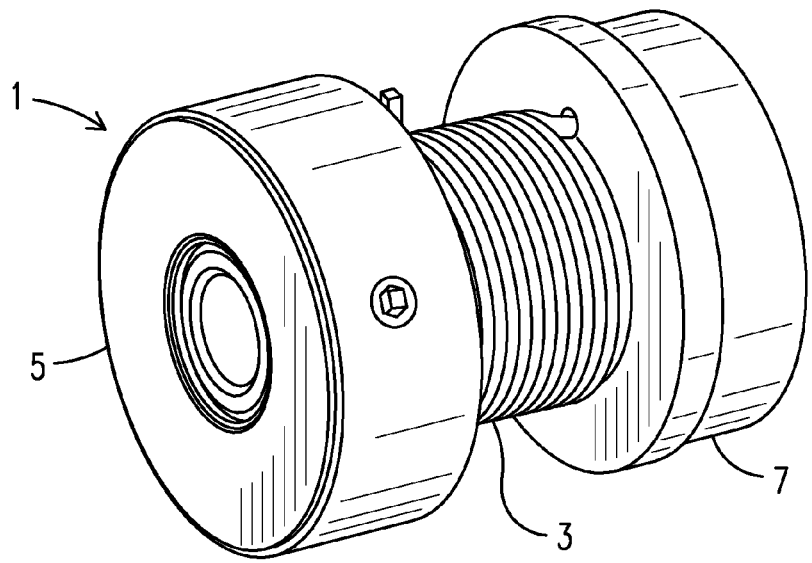
FIG. 1 is a perspective view of a prior art wrap spring clutch.
Figure 2:
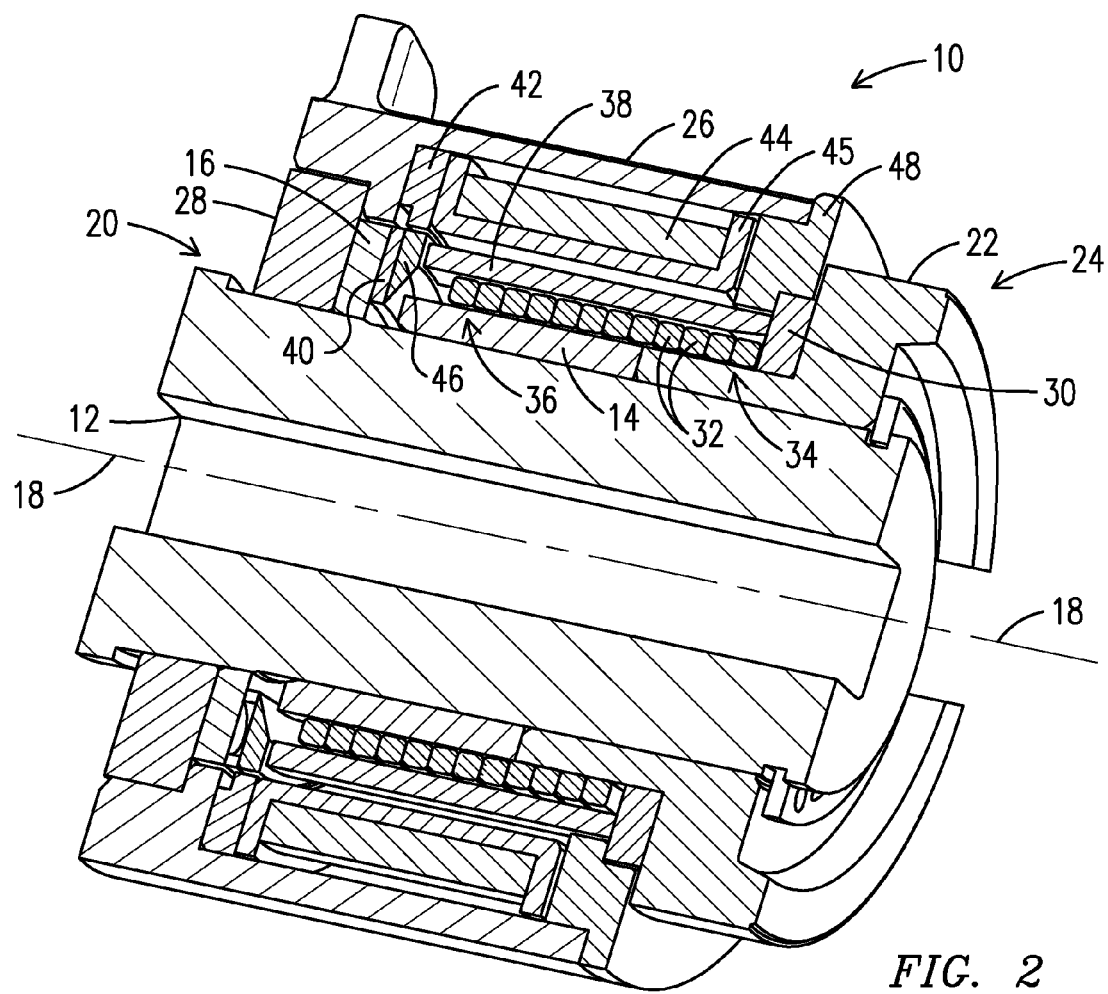
FIG. 2 is a cross-sectional view of a wrap spring clutch in accordance with one embodiment of the invention.

FIG. 2 is a cross-sectional view of a wrap spring clutch 10 in accordance with one embodiment of the present invention. An input shaft 12 is provided for receiving mechanical energy in the form of shaft rotation from a power source (not shown) such as a motor or turbine. The input shaft 12 is coupled to an input hub 14 and an input flange 16 which all rotate together about an axis of rotation 18. The shaft 12, hub 14 and flange 16 are illustrated as separate parts that are joined together, such as by a shrink fit; however, in other embodiments they may be formed integrally or in different combinations of structures. These structures may collectively or individually be referred to as an input element 20, and the input element in other embodiments may include other structures coupled together for coincident rotation at the device input.

An output hub 22 is disposed proximate the input hub 14 along the axis of rotation 18. In the embodiment of FIG. 2, there is no output shaft illustrated, but one skilled in the art may appreciate that an output shaft or other structures coupled for coincident rotation with the output hub 22 may be used in various embodiments and may collectively or individually be referred to as an output element 24. The input element 20 and the output element 24 are supported for rotation within a clutch housing 26 by respective input and output bearings 28, 30.

A spring such as helical coil spring 32 is disposed about the input hub 14 and output hub 22 and has an output end 34 that is connected to the output hub 22 for rotation therewith. Spring 32 also has an input end 36 that is attached to a moveable control element such as control collar 38. The control collar 38 surrounds the spring 32 and is radially constrained by the spring, and while the control collar 38 is restrained somewhat by axial forces exerted by the spring, it has a degree of freedom of movement in an axial direction parallel to the axis of rotation 18.

A permanent magnet 40 is disposed proximate an input end of the control collar 38. Control collar 38 is made of a ferromagnetic material such as steel or any alloy containing iron, nickel, gadolinium or other material attracted toward a region of greater magnetic field. The permanent magnet 40 attracts the control collar 38 and moves it to an engaged position (i.e. toward the permanent magnet 40 and toward the input end of the clutch 10) where it becomes frictionally engaged with the pole 46. The pole 46, permanent magnet 40 and input flange 16 are all engaged to rotate together with the input hub 14 and can be considered to be part of input element 20, although in other embodiments the permanent magnet need not necessarily be a rotating component. Spring 32 has as inside diameter when in a rest condition that is somewhat larger than an outside diameter of the input hub 14 and of the output hub 22. However, upon becoming frictionally engaged with the pole 46, the control collar 38 will rotate with the input element 20, thereby causing the spring 32 to wrap down on both the input hub 14 and the output hub 22 and to transmit torque there between to engage the clutch 10. One may appreciate, therefore, that the permanent magnet wrap spring clutch 10 of the present invention is capable of transmitting torque without the supply of any electrical power to the clutch 10.

Permanent magnet 40 may be made of any material known in the art, for example a rare earth material. Rare earth materials are known to be brittle and are not particularly well suited for friction forces, so embodiments of the present invention may include a contacting structure that rotates with the input element and is located between the permanent magnet and the control element. In the embodiment of FIG. 2, pole 46 functions as such a contacting structure, and it is also one of the structures that functions to focus the magnetic field generated by the permanent magnet 40 to pass through the control collar 38. In the embodiment of FIG. 2, the magnetic field generated by the permanent magnet 40 tends to pass through the pole 46, control collar 38, end element 48, clutch housing 26 and input flange 16, thereby attracting the moveable control element 38 toward the permanent magnet 40 and into the engaged position. The permanent magnet may be a single magnet or a plurality of separate magnets in various embodiments, and may be custom made to a particular geometry or may be standard commercially available shapes. In one embodiment, a plurality of small button shaped magnets may be arranged around a circumference of the clutch within a ring shaped carrier made of nonmagnetic material. Custom made magnets may be shaped to at least partially focus their magnetic field where desired, and various focusing structures may be used to further direct the magnet field for any particular application.

Clutch 10 is also provided with a coil 44, disposed in a coil housing 45, that can be selectively supplied with an electrical current. When electrical current is caused to pass through the coil 44, it will generate a magnetic field that functions to redirect the magnet field generated by the permanent magnet 40 away from the control collar 38, thereby allowing the control collar 38 to move out of the engaged position to a disengaged position (i.e. away from the permanent magnet 40 and toward the output end of the clutch 10). In the disengaged position, the control collar 38 is no longer frictionally engaged with the pole 46, thereby allowing the spring 32 to unwrap to terminate the transmittal of torque between the input hub 14 and the output hub 22 to disengage the clutch 10. The magnet field generated by the energized coil 44 redirects the magnetic field generated by the permanent magnet 40 to pass generally through the pole 46, shunt 42, clutch housing 26 and input flange 16, thereby no longer attracting control element 38 strongly enough to engage the clutch 10. Because the spring 32 has an inside diameter at rest that is larger than the outside diameter of the input and output hubs 14, 22, the mere unwrapping of the spring 22 causes complete disengagement of the clutch 10 without the need for any further rotation of the output element 24. This feature ensures the functionality of the clutch 10 even when the output element 24 is connected to a low momentum or high drag output load.

The axial length of the spring 32 in a relaxed state may be selected so that the control collar 38 is pulled away from the pole 46 to the disengaged position to eliminate contact there between when the control collar 38 is not under the influence of the permanent magnet 40 (i.e. when the coil 44 is energized). When the control collar 38 is under the influence of the permanent magnet 40 (i.e. when the coil 44 is not energized) and is moved to the engaged position, the spring 32 is axially stretched to a degree. In such an embodiment, the attraction between the permanent magnet 40 and the control collar 38 must be sufficient to stretch the spring 32 and to provide the desired amount of force between opposing faces of the control collar 38 and pole 46 in order to generate circumferentially oriented frictional forces that are sufficient to cause the spring 32 to wrap down on the input and output hubs 14, 22 to engage the clutch 10.

A clutch in accordance with the present invention provides the certainty of disengagement that is available with prior art direct acting wrap spring clutches, but it avoids the requirement for electrical power in order to transmit torque that exists with prior art direct acting wrap spring clutches. This unique functionality is enabled by using a permanent magnet to actuate the spring wrapping action that is required to transmit torque in a direct acting wrap spring clutch. Disengagement of the clutch of the present invention is then accomplished with the use of electrical power by selectively energizing an electrical coil in order to redirect the magnetic field of the permanent magnet so that it no longer actuates the spring wrapping action. Unlike prior art reverse acting wrap spring clutches which require continued rotational motion of the output element in order to unwrap the spring to disengage the clutch, the clutch of the present invention provides disengagement that is powered only by the spring returning to its at-rest diameter in the absence of a countervailing actuating force.

Figure 3:
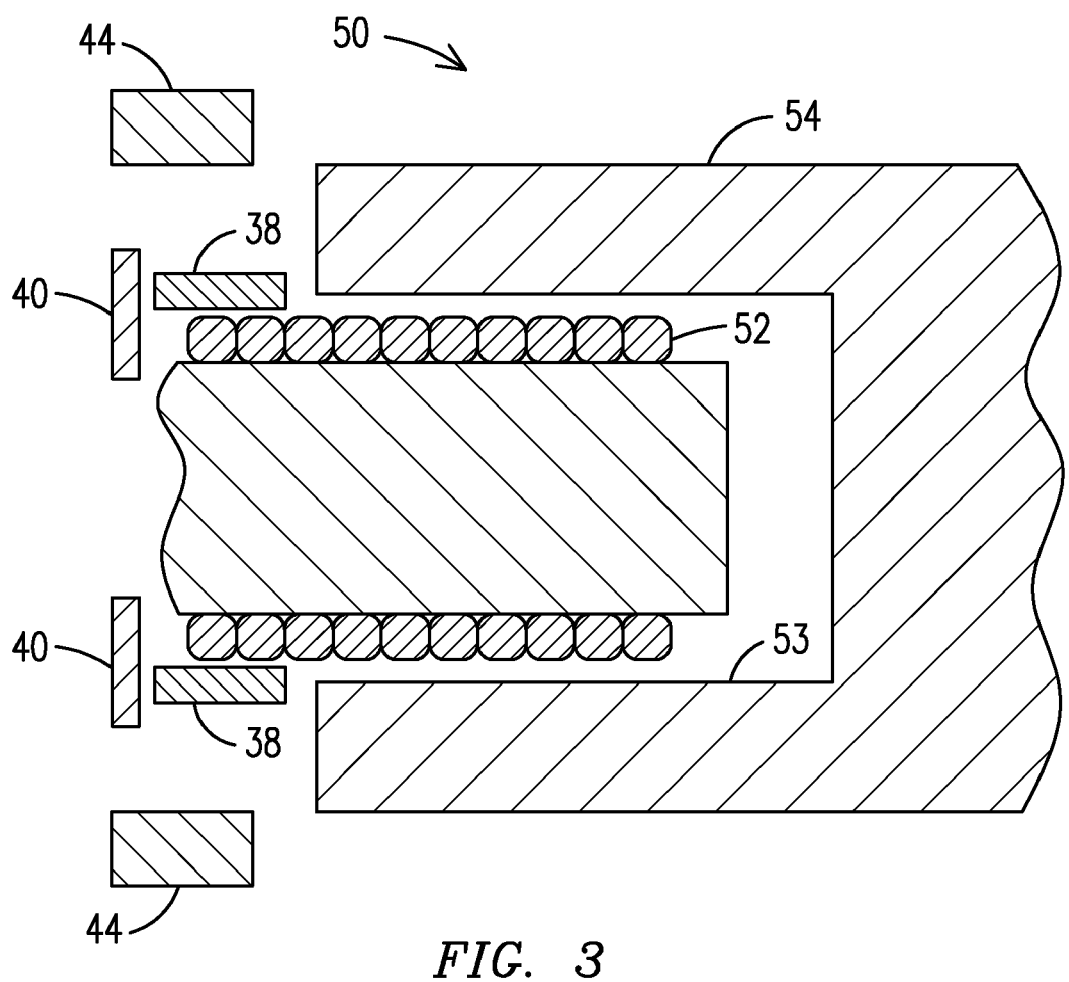
FIG. 3 is a partial cross-sectional view of a wrap spring clutch in accordance a second embodiment of the invention.

As used herein, the term "wrapped" is meant to mean that the spring diameter is smaller than when "unwrapped"; however, the term "wound" is meant only to mean that the spring diameter is urged away from its at-rest ("unwound") condition, so that a spring may be unwound to a smaller diameter than its resting condition or unwound to a larger diameter than its resting condition. In this regard, the present invention may also be utilized in spring clutches where the spring is unwrapped to engage the clutch, such as is illustrated in partial cross-sectional view in the wrap spring clutch 50 of FIG. 3. In such embodiments, an increase in the outer diameter of the spring 52 causes it to engage an inner diameter 53 of a cylinder 54 attached to one of either the driven or drive shaft. FIG. 3 illustrates the clutch 50 in the disengaged condition wherein the spring is in its resting condition and does not make contact with the cylinder 54. The concept of operation of such an embodiment is the same as discussed above except that radial expansion of the spring is required to engage the clutch. In such embodiments, a permanent magnet is utilized to actuate a spring unwrapping (winding) action that is required to transmit torque through the clutch; and for disengagement, an electric coil is energized to redirect the magnetic field of the permanent magnet so that it no longer actuates the spring unwrapping action, thus allowing the spring to return to an unwound smaller at-rest diameter which is no longer in contact with the surrounding cylinder.

One skilled in the art may appreciate that arrangements other than the embodiment of FIG. 2 may be envisioned within the scope of the present invention. For example, the location and shape of the permanent magnet or magnets may be varied, as well as the structures used to focus the magnetic field of the permanent magnet toward the control collar. Moveable engaging members other than the illustrated control collar may be used depending upon the overall geometry of the clutch assembly. The spring may be affixed to either the output element (as illustrated) or the input element proximate either end, and may be attached to the control element proximate the respective opposed end, thereby resulting in the spring either being at rest in the disengaged position (as illustrated) or rotating with the input element in the disengaged position. The location of the permanent magnet may be selected accordingly and it may be supported by the input element, the output element, or the clutch housing. Other components and techniques for redirecting or counteracting the effect of the magnetic field of the permanent magnet may be used to activate disengagement of the clutch. While various embodiments of the present invention have been shown and described herein, it will be obvious that such embodiments are provided by way of example only. Numerous variations, changes and substitutions may be made without departing from the invention herein.

The invention claimed is:

1. A wrap spring clutch comprising:
    an input element and an output element positioned adjacent to each other for rotation around a common axis of rotation;
    a spring surrounding at least respective portions of the input element and the output element and comprising an output end attached to the output element;
    a permanent magnet positioned adjacent an input end of the spring;
    a control element attached to the input end of the spring and responsive to a magnetic field generated by the permanent magnet alone without a need for any electrical power to be supplied to the clutch to move from a disengaged position to an engaged position in which the control element frictionally engages the input element so that, upon rotation of the input element about the axis of rotation, the control element causes the spring to wrap down on both the input element and the output element to transmit torque there between; and
    a coil responsive to a selectively applied electrical current passing there through to selectively redirect the magnetic field generated by the permanent magnet away from the control element;
    the control element being responsive to the presence of the electrical current in the coil and the redirection of the magnetic field generated by the permanent magnet to move from the engaged position to the disengaged position where it is no longer frictionally engaged with the input element so as to allow the spring to unwrap to terminate the transmittal of torque between the input element and output element.

2. The wrap spring clutch of claim 1, wherein the permanent magnet is attached to rotate with the input element.

3. The wrap spring clutch of claim 1, wherein an axial length of the spring in a relaxed state is such that the control element is pulled away from the input element to eliminate contact there between when the coil is energized by the electrical current.

4. The wrap spring clutch of claim 1, wherein the input element comprises the permanent magnet and a contact element disposed between the control element and the permanent magnet, the control element frictionally engaging the contact element in the engaged position.

5. The wrap spring clutch of claim 4, wherein the contact element comprises a pole element effective to focus the magnetic field generated by the permanent magnet through the control element when the coil is not energized by the electrical current.

6. The wrap spring clutch of claim 5, further comprising:
    the coil being disposed in a coil housing: and
    a shunt disposed proximate the coil housing and effective to direct the magnetic field generated by the permanent magnet away from the control element when the coil is energized by the electrical current.

7. A wrap spring clutch comprising:
    an input element disposed proximate an output element for rotation about a common axis of rotation;
    a helical spring disposed around portions of both the input element and the output element and affixed to a first of the input and output elements;
    a control element comprising a ferromagnetic material also attached to the spring and axially movable between an engaged position, where the control element is frictionally engaged with a second of the input and output elements for rotation there with to cause the spring to wrap down on both the input and output elements, and a disengaged position, where the control element is not engaged with the second of the input and output elements thereby allowing the spring to unwrap from the input and output elements;
    a permanent magnet generating a magnetic field generating motive force sufficient to urge the control element from the disengaged position to the engaged position to cause engagement of the clutch without the need for electrical power; and
    a coil which when energized generates a magnetic field effective to redirect the magnetic field generated by the permanent magnet away from the control element to allow the control element to move to the disengaged position.

8. The wrap spring clutch of claim 7, wherein an input end of the spring is attached to the control element and an output end of the spring is attached to the output element, whereby the control element is in frictional engagement with the input element when in the engaged position.

9. A wrap spring clutch comprising:
    an input element disposed proximate an output element for rotation about a common axis of rotation;
    a spring disposed about the axis of rotation and attached to a first of the input and output elements;
    the spring sized in a resting condition not to engage a second of the input and output elements to disengage torque transmittal there between;
    a control element attached to the helical spring;

a permanent magnet generating a magnetic field sufficient to move the control element from a disengaged position to an engaged position in which the control element frictionally engages the second of the input and output elements, without the need for electrical power to be provided to the clutch, so that, upon rotation of the input element about the axis of rotation, the control element winds the spring to engage both the input element and the output element to transmit torque there between; and a coil responsive to a selectively applied electrical current passing there through to generate a magnetic field effective to redirect the magnetic field generated by the permanent magnet away from the control element to allow the control element to be moved out of engagement with the second of the input and output elements by the spring unwinding to the resting condition, thereby terminating the transmittal of torque between the input element and output element.

10. The wrap spring clutch of claim 9, further comprising:
the spring comprising an output end attached to the output element;
the control element being attached to an input end of the spring and being moved into frictional engagement with the input element by the permanent magnet magnetic field; and
the spring having an inside diameter in the resting condition larger than a surrounded portion of the input element, so that upon rotation of the input element in the absence of the electrical current passing through the coil, the spring is wound to wrap down on the input and output elements to transmit torque there between.

11. The wrap spring clutch of claim 10, wherein the permanent magnet is attached to rotate with the input element.

12. The wrap spring clutch of claim 10, wherein an axial length of the spring in a relaxed state is such that the control element is pulled away from the input element to eliminate contact there between when the coil is energized by the electrical current.

13. The wrap spring clutch of claim 10, wherein the input element comprises the permanent magnet and a contact element disposed between the control element and the permanent magnet, the control element frictionally engaging the contact element in the engaged position.

14. The wrap spring clutch of claim 13, wherein the contact element comprises a pole element effective to focus the magnetic field generated by the permanent magnet through the control element when the coil is not energized by the electrical current.

15. The wrap spring clutch of claim 14, further comprising:
the coil being disposed in a coil housing; and
a shunt disposed proximate the coil housing and effective to direct the magnetic field generated by the permanent magnet away from the control element when the coil is energized by the electrical current.

16. The wrap spring clutch of claim 9, further comprising:
the spring having an outside diameter in the resting condition smaller than a surrounding portion of the second of the input and output elements.

* * * * *